Aug. 23, 1932.   F. S. CASSE   1,872,887
SCRAPER
Filed May 19, 1930

INVENTOR.
FREDERICK S. CASSE.
BY
ATTORNEY.

Patented Aug. 23, 1932

1,872,887

UNITED STATES PATENT OFFICE

FREDERICK S. CASSE, OF SAN FRANCISCO, CALIFORNIA

SCRAPER

Application filed May 19, 1930. Serial No. 453,615.

This invention relates to improvements in scrapers and more particularly to meat scrapers.

Among the objects of the invention is to provide a sanitary, effective and simply operable means for scraping meat, especially for invalids.

Another object is to simplify the construction so that it may be fabricated at the minimum cost. Other objects and advantages will appear as the description progresses.

In this specification and the accompanying drawing the invention is disclosed in its preferred form. But it is to be understood that it is not limited to this form because it may be embodied in other forms. It is also to be understood that in and by the claims following the description it is desired to cover the invention in whatsoever form it may be embodied.

Figure 1:
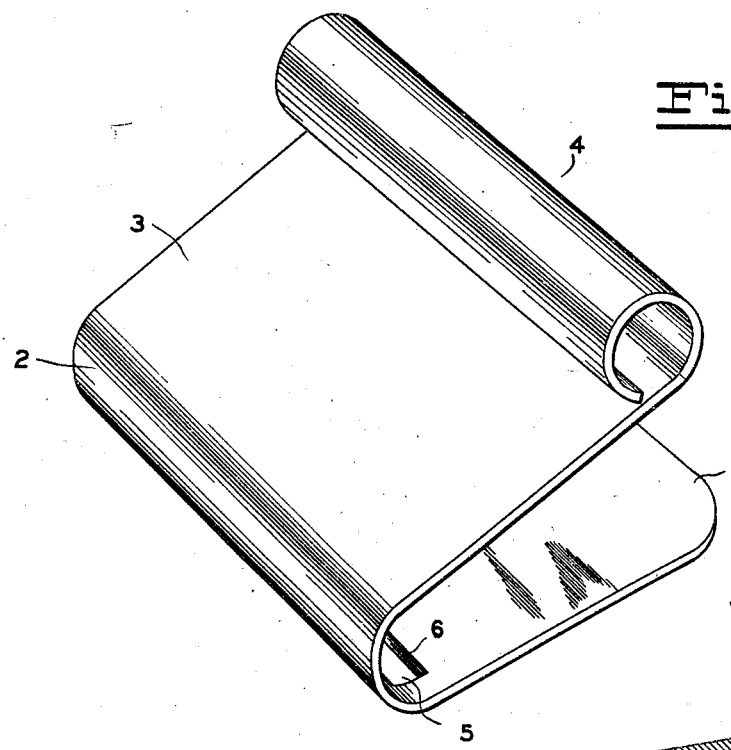
Fig. 1 is a perspective view from above of a meat scraper constructed in accordance with this invention.
Figure 3:
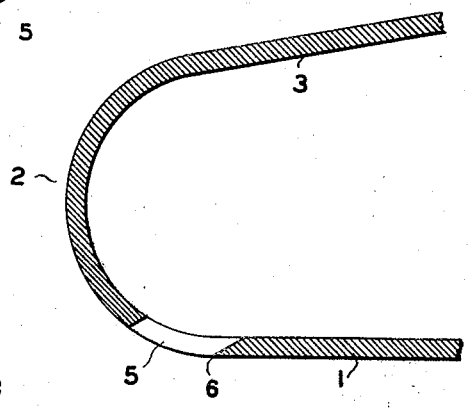
Fig. 3 is an enlarged fragmentary detail in cross-section of the same taken on the line III—III, Fig. 2, showing the preferred location of the scraping edge.
Figure 2:
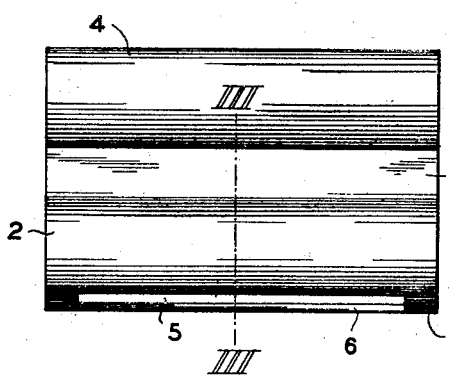
Fig. 2 is a front elevation of the same.

In detail the construction illustrated in the drawing comprises the integral piece of sheet metal 1, bent at 2, to form the overhanging plate 3 in juxtaposition to the plate 1, and having its end curled back to form the handle 4.

The base plate 1 is transversely slotted at 5. The rear edge of this slot is beveled to form the scraping edge 6. It is desirable that this edge not be too sharp, since it is intended to scrape, not to cut the fibers, nerves and tougher portions of the meat.

The curled edge 4 is used as a handle. It is grasped so that the fingers extend between the plates 1—3, with the palm of the hand overlying the plate 3.

The slice of meat to be scraped is laid flat on a table or board and held with the other hand. The handle 4 is grasped as described, with the plate 1 resting upon the surface of the meat. When pressure is applied to the scraper the edible cells of the meat project slightly above the scraping edge 6, and are scraped off as the scraper is drawn forward.

If coarser particles of meat are desired, the scraper is held at an angle to the surface of the meat so that the cells project further up into the opening 5.

The scraped meat accumulates on top of the plate 1, from whence it is easily removed to be used as a spread on bread when eaten raw, or prepared in various ways according to the dietetic requirements.

The structure of the scraper renders it easily washed or sterilized. It may be sharpened by introducing a flat file through the slot 5 parallel with the bevel 6. This edge 6 is not to be confused with cutting edges. It is not desirable to cut the nerves, tendons and other tough indigestible portions of the meat, nor to cut through the cellular walls of the fleshy portion, which would release the desirable juices therefrom.

Having thus described this invention, what is claimed and desired to secure by Letters Patent is:

1. A scraper comprising a strip of sheet metal bent back upon itself to form upper and lower plates in juxtaposition and having a slot in said lower plate adjacent said bent portion, the rear edge of said slot being sharpened to form a scraping edge in the plane of the lower plate, the forward edge of the slot being cut in said bent portion and projecting downward in advance of the scraping edge to limit the depth of the scraping movement of the sharpened edge.

2. A scraper comprising a strip of sheet metal bent upward at one end and having a slot adjacent said bent portion, the rear edge of said slot being sharpened to form a scraping edge in the plane of the bottom portion of the plate, the forward edge of the slot being cut in said bent portion and projecting downward in advance of the scraping edge to limit the depth of the scraping movement of the sharpened edge.

In testimony whereof, I have hereunto set my hand this 15th day of May, 1930.

FREDERICK S. CASSE.